United States Patent [19]
Weber et al.

[11] Patent Number: 5,269,569
[45] Date of Patent: Dec. 14, 1993

[54] BELL LIP RESTRAINING CONFIGURATION FOR PRESSURE PIPE

[75] Inventors: Joe Weber, Birmingham; Lawrence S. Jones, Hueytown, both of Ala.

[73] Assignee: United States Pipe and Foundry Company, Birmingham, Ala.

[21] Appl. No.: 977,971

[22] Filed: Nov. 18, 1992

[51] Int. Cl.⁵ ............................................. F16L 21/02
[52] U.S. Cl. ................................. 285/104; 285/232; 285/322
[58] Field of Search ............... 285/322, 323, 104, 105, 285/232

[56] References Cited

U.S. PATENT DOCUMENTS

| | | | |
|---|---|---|---|
| 1,930,194 | 10/1933 | Dillon | 285/194 |
| 2,953,398 | 9/1960 | Haugen et al. | 285/110 |
| 3,724,880 | 4/1973 | Seiler | 285/105 |
| 3,733,093 | 5/1973 | Seiler | 285/342 |
| 3,963,298 | 6/1976 | Seiler | 339/95 R |
| 4,108,481 | 8/1978 | Graham | 285/231 |
| 4,229,025 | 10/1980 | Volgstadt et al. | 285/323 X |
| 4,229,026 | 10/1980 | Seiler | 285/105 |
| 4,648,633 | 3/1987 | Bergmann | 285/348 X |
| 4,660,866 | 4/1987 | Jones et al. | 285/231 |
| 4,805,932 | 2/1989 | Imhof et al. | 285/4 |
| 5,067,751 | 11/1991 | Walworth et al. | 285/105 |
| 5,197,768 | 3/1993 | Conner | 285/232 |

FOREIGN PATENT DOCUMENTS 0622389  6/1961  Canada .............................. 285/337

*Primary Examiner*—Randolph A. Reese
*Assistant Examiner*—Heather Chun
*Attorney, Agent, or Firm*—James W. Grace

[57] ABSTRACT

A wall at one end of a chamber in the bell end of an enclosing pipe is adapted to receive the nose end of toothed metal segments to prevent disengagement of pipes and to transfer radial forces into axial forces.

4 Claims, 2 Drawing Sheets

BELL LIP RESTRAINING CONFIGURATION FOR PRESSURE PIPE

BACKGROUND OF THE INVENTION

1. Field of the Invention

The present invention relates to a spigot-and-socket joint which is secured against separation or pulling apart under high pressure fluid flow across the joint.

In particular, an elastomeric or rubber ring having toothed metal segments is placed in a conical chamber in the socket end and a compression ring is placed in the same chamber to push the rubber ring with the toothed metal segments in a direction to force the teeth of the toothed segments into contact with the spigot end of a pipe enclosed in the socket of a second pipe. To prevent a fracture of the pipe bell when toothed segments abut against the outer wall of the socket, the socket has a recess and the segments have shoulders which engage the recess to convert a wedge force into an axial force.

2. Description of the Prior Art

A similar joint is illustrated in U.S. Pat. No. 4,805,932, issued Feb. 21, 1989. This patent shows a spigot-and-socket joint which is secured against pulling apart, wherein the spigot end of one pipe is pushed into the socket end of another pipe, with radial play. The joint comprises a sealing ring and a gripping ring in the socket pipe, the gripping ring comprising a plurality of metal gripping segments mutually spaced circumferentially and each having a spherically convex radially outer surface and being interconnected in the circumferential direction by a vulcanized intermediate piece of rubber or the like, and a toothed configuration on the radially inner surface, so that when axial tensile forces arise at the joint, the toothed configurations are pressed radially inwardly against the spigot end by interaction of the spherically convex surfaces with an interior conical surface of the pipe socket which interior surface narrows in the direction of the distal end of the socket. In order to effectively eliminate relative radial movements of the gripping ring when the joined pipes are first subject to interior fluid pressure, an elastomeric holding piece is formed on the gripping ring, which gripping ring is separate from the sealing ring, the holding piece being attached to the distal end face of the socket and supporting the gripping ring.

It has been found that in actual practice the holding piece, referred to as a collar in the patent, causes serious problems. When the spigot end of one pipe is pushed into the socket end of the other pipe, the toothed elements move inwardly of the socket but the rubber web between the elements does not move uniformly and can cause uneven distribution of the toothed elements.

Additionally, at extreme fluid pressures, it has been found that one or more segments can protrude past the distal end face of the socket and with a wedging force fracture the socket.

The patented joint has failed at a pressure lower than desired.

An improvement in the prior art over that described in U.S. Pat. No. 4,805,932 has been developed. The improvement comprises the elimination of the collar or holding piece formed on the gripping ring and the insertion of a compressible elastomeric ring located between the gripping ring and a radial wall in the socket. The compressible ring applies a force to the gripping ring to insure tight contact between the toothed configurations of the gripping ring and the spigot end of one of the pipes.

SUMMARY OF THE INVENTION

The invention comprises a spigot-and-socket joint in which a gripping ring is placed in a conical chamber in the socket end of one pipe and a compressible ring is placed between one side of the retaining ring and a wall of the socket. The gripping ring has a number of metal gripping segments with exposed teeth to bite into the outer surface of the spigot. The compressible ring pushes the gripping ring in a direction to force the teeth of the gripping segments into close contact with the outer surface of the spigot.

In this invention, the joint is prevented from separation by the holding action of the teeth penetrating the outer surface of the spigot and the abutting action of the toothed gripping segments against a wall of the conical chamber.

OBJECTS OF THE INVENTION

It is an object of the present invention to provide a novel restraining mechanism for pressure pipe joints which is reliable and easy to assemble.

It is a further object of the present invention to provide a novel restraining mechanism for pressure pipe joins which overcomes the short comings of the prior art restraining mechanisms.

BRIEF DESCRIPTION OF THE DRAWING

Other objects and advantages of the present invention will become apparent to those skilled in the art from the following description of the invention taken in conjunction with the accompanying drawing in which like numerals indicate like elements and in which.

DESCRIPTION OF THE PREFERRED EMBODIMENT

Figure 2:
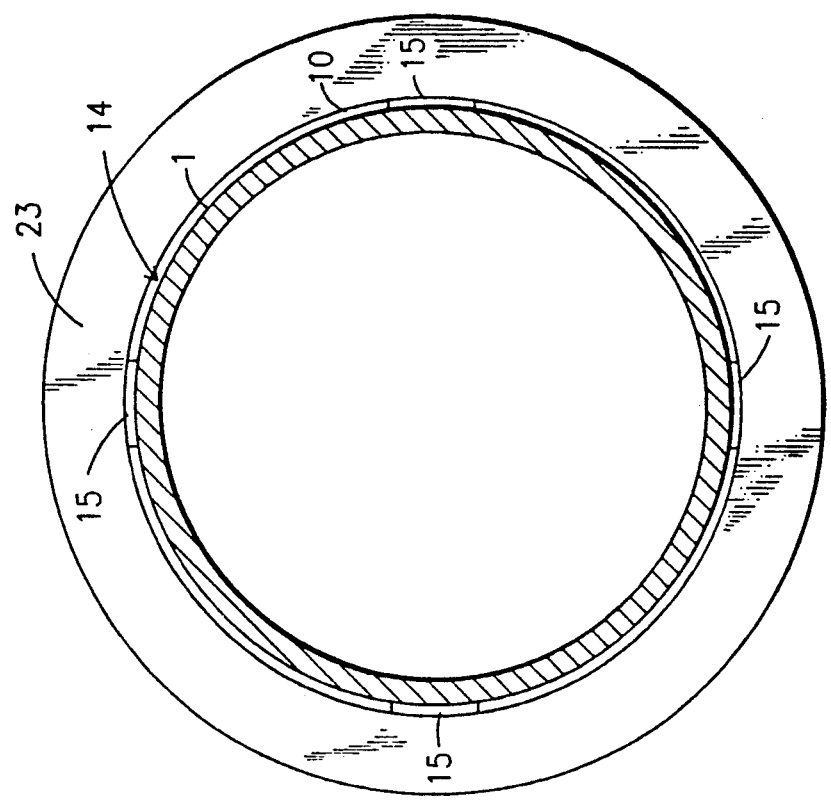
FIG. 2 is a cross-section view taken along line II—II of FIG. 1.
Figure 1:
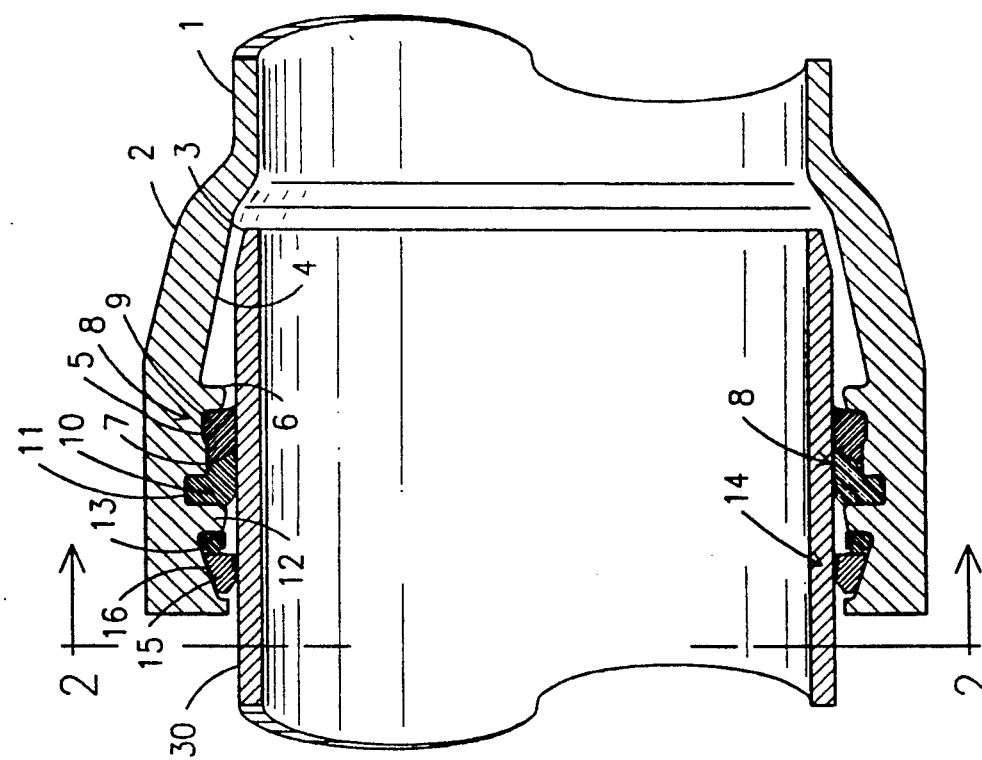
FIG. 1 is a longitudinal cross-sectional view through the spigot end of a pipe with the socket end of an adjoining pipe being engaged with the said spigot end according to the invention.
Figure 3:
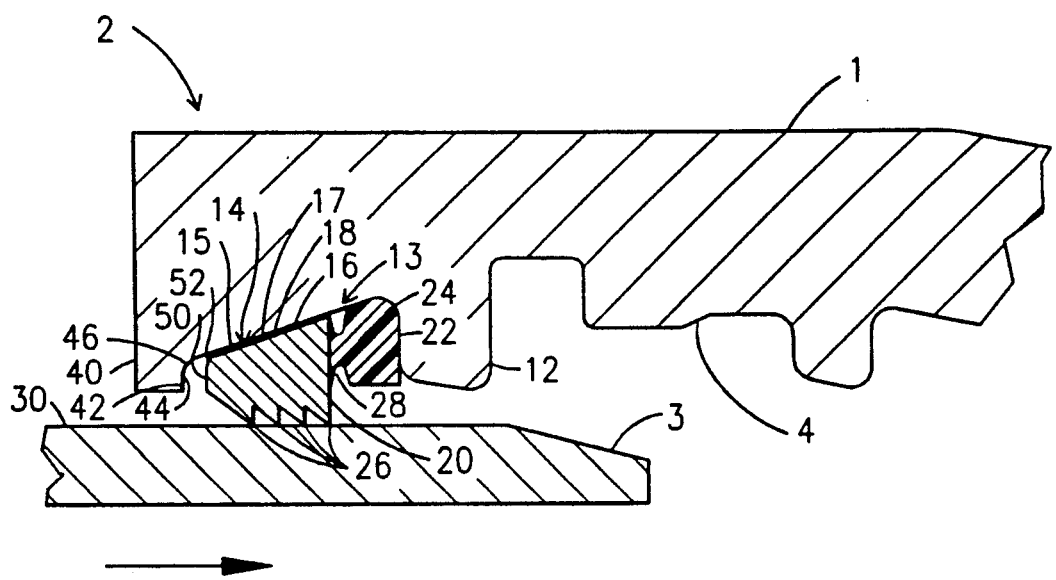
FIG. 3 is an enlarged view of a portion of FIG. 1 showing the initial insertion of a spigot into the bell end of another pipe.

As seen from the drawings, and preferably FIG. 1, a pipe 1 has a socket on its socket end 2. A spigot end 3 of an adjoining pipe 30 can be inserted in the socket 2, with radial play. A recess 4 is provided in the interior of the socket, which recess allows the two pipes 1, 30 to swing with respect to each other, over a limited range. A sealing chamber 5 adjoins recess 4, which chamber 5 is bounded axially outwardly by a radially extending inner shoulder 6 on the socket end 2. A ring-shaped bead 7 is located in the region of chamber 5, at a distance from shoulder 6. The bead 7 serves to hold in place a sealing ring 8 which has a head section 9 comprised of a soft elastomer material and a foot section 10 comprised of a harder elastomer material. This foot section 10 is disposed in a ring-shaped groove 11 bounded on one side by the ring-shaped bead 7 and on the other by an abutting shoulder 12. Ring 8 is thereby held in position, and remains in the position illustrated even as the spigot end 3 is inserted in the socket end 2 with deformation of the head section 9. A locking chamber 13 is disposed between the abutting shoulder 12 and the distal end of the socket 2. Chamber 13 serves to accommodate a gripping ring 14 which is comprised of a plurality (four, see FIG. 2) of gripping segments 15 disposed at a distance apart in the circumferential direction. Segments 15 are interconnected in the circumferential direction by respective intermediate pieces 16 comprised of rubber material or the like. As shown in FIG. 3, segments 15 each have a spherically convex outer surface 17 on their side directed toward the wall of the locking chamber 13. This surface 17 interacts with the interior surface 18 of the socket which surface narrows conically as the distal end is approached, whereby as a result of such interaction the toothed configuration 26 on the interior surface of each of the gripping segments 15 is pressed radially inwardly against the spigot end 3 when axial tensile forces are present which tend to disengage the joint.

Inserted between rear wall 20 of the gripping ring 14 with its series of gripping segments 15 and a face 22 of inwardly radially extending wall 12 is a compressible rubber ring 24 which forces teeth 26 into intimate contact with the outer surface of spigot 3. Ring 24 has a circumferential groove 28 intermediate its ends to permit compression of the ring when spigot 3 is inserted (see FIG. 3), so that gripping segments 15 are held in close intimate contact with the outer surface of spigot 3 of pipe 30. As spigot 3 enters and further penetrates into locking chamber 13 as shown in FIG. 3, segment 15 moves to the right, axially upwardly with respect to the conical undersurface of wall 18 of locking chamber 13 until the teeth 26 ride on the outer surface of spigot 3. This axial movement is opposed by compression ring 24 which forces teeth 26 into intimate contact with the outer surface of spigot 3. Under high fluid pressure in the joint, the spigot 3 of pipe 30 tends to move out of socket end 2 of pipe 1. As spigot end 3 moves to the left as shown in FIG. 4, teeth 26 bite deeper into the outer surface of the spigot and grasp the spigot to prevent disengagement of the pipes and rupture of the joint.

Because ring 24 is compressible, a force is applied to gripping segments 15 by the conical wall 18 of locking chamber 13 so they bite into the outer surface of spigot 3. The joint is kept from disengagement even if the distance between the opening of the socket and the outer surface of the spigot varies within a wide range of tolerances.

At the distal or outer end of socket 2 there is a radially inwardly directed wall 40 through which spigot 3 enters socket 2. Wall 40 forms the outer end of chamber 13. The inner face 42 of wall 40 at its upper end 44 has a radius 46 forming a short abutment. The shoulder end 50 of segment 15 also has a radius 52.

Figure 4:
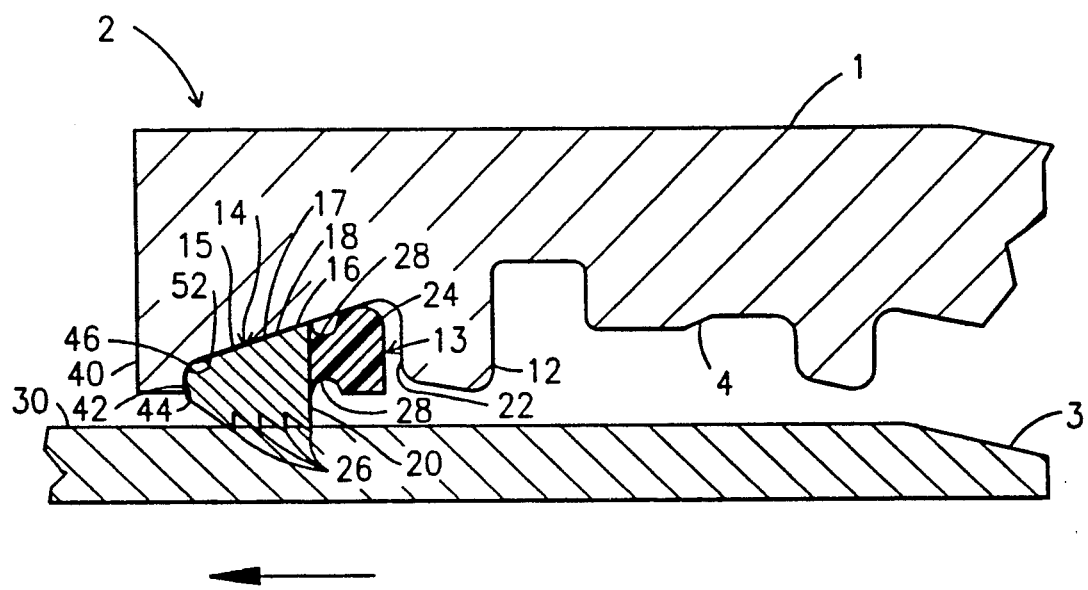
FIG. 4 is an enlarged view of a portion of FIG. 1 showing the position of the spigot and the bell end of another pipe during partial disengagement of the pipes.

As segment 15 moves to the left (as shown in FIG. 4), shoulder end 50 with its radius 52 nestles into the corresponding radius 46 of inner face 42 of wall 40. As further force is applied to segment 15 to tend to separate the two pipes, the abutment of wall 54 of segment 15 against inner face 42 of wall 40 of socket 2 converts the former wedging force between the wall 18 of chamber 13 and surface 17 of segment 15 into an axial force which wall 40 can withstand.

Thus, greater fluid pressure can be withstood by the configuration of the present invention than the fluid pressure withstood by the prior art.

Whereas the present invention has been described with respect to specific embodiments thereof, it should be understood that the invention is not limited thereto as many modifications thereof may be made. It is, therefore, contemplated to cover by the present application any and all such modifications as fall within the true spirit and scope of the appended claims.

We claim:

1. A spigot-and-socket joint for pipes having a longitudinal axis wherein a spigot end of a pipe is inserted into a socket end of another pipe, comprising:
   a socket end on a pipe having a larger diameter than the spigot end for providing radial play between said socket end and spigot end;
   a sealing ring in said socket end between said socket end and spigot end;
   an interior surface portion on said socket end defining a gripping ring chamber and having a substantially conical configuration which is narrower in the direction of the distal end of said socket end;
   said chamber further having a radially inwardly extending wall that is perpendicular to the axis at the narrowest end of said chamber, said wall having a radius at the upper end of said wall;
   a separate gripping ring in said gripping ring chamber;
   said gripping ring comprising a plurality of gripping segments in circumferentially spaced relationship,
   intermediate pieces of resiliently deformable material interconnecting said gripping segments,
   a substantially spherically convex radially outer surface on each gripping segment engageable with said conical interior surface portion,
   each of said segments further having a radially extending end face having a radius at the connection between said end face and said spherically convex radially outer surface of said segment, and
   a radially inner surface on each gripping segment having a toothed configuration engageable with said spigot end, so that axial force in the direction of separation of said socket end and inserted spigot end causes said gripping segments to be pressed radially inwardly against said spigot end by interaction between said conical interior surface portion of said socket end and said outer surfaces of said gripping segments for retaining said spigot end in said socket end against said axial force, and wherein said radially inwardly extending wall of said chamber can engage said end face of said segment,
   said gripping ring chamber further having an inwardly radially extending wall forming one end of said gripping ring chamber, and
   a compressible means surrounding said spigot end, said compressible means being disposed in said gripping ring chamber between said gripping ring and said radially extending wall.

2. A spigot-and-socket joint for pipes as recited in claim 1 in which said gripping segments have spaced teeth on the face of each segment opposite said spherically convex radially outer surface.

3. A spigot-and-socket joint for pipes as recited in claim 1 in which said compressible means is an elastomeric ring.

4. A spigot-and-socket joint for pipes as recited in claim 3 in which said elastomeric ring has a groove intermediate its ends to allow compression of said elastomeric ring.

* * * * *